United States Patent
Otsubo et al.

(12)

(10) Patent No.: US 10,148,143 B2
(45) Date of Patent: Dec. 4, 2018

(54) MOTOR AND METHOD FOR MANUFACTURING MOTOR

(71) Applicant: NIDEC SANKYO CORPORATION, Nagano (JP)

(72) Inventors: Keishi Otsubo, Nagano (JP); Shinichi Utsumi, Nagano (JP); Yuji Maruyama, Nagano (JP); Hideo Shimodaira, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 301 days.

(21) Appl. No.: 15/279,441

(22) Filed: Sep. 29, 2016

(65) Prior Publication Data
US 2017/0093235 A1 Mar. 30, 2017

(30) Foreign Application Priority Data
Sep. 30, 2015 (JP) ................. 2015-193969

(51) Int. Cl.
*H02K 1/27* (2006.01)
*H02K 1/14* (2006.01)
(Continued)

(52) U.S. Cl.
CPC ....... *H02K 1/2706* (2013.01); *F04D 13/0606* (2013.01); *F04D 13/0693* (2013.01);
(Continued)

(58) Field of Classification Search
CPC ........ H02K 1/2706; H02K 1/14; H02K 3/522; H02K 5/128; H02K 7/08
See application file for complete search history.

(56) References Cited

U.S. PATENT DOCUMENTS 8,476,795 B2 * 7/2013 Wakabayashi ......... H02K 29/08
310/68 B
9,893,587 B2 * 2/2018 Shi ....................... H02K 5/1675
(Continued)

FOREIGN PATENT DOCUMENTS

| CN | 101728877 | 6/2010 |
| CN | 102263452 | 11/2011 |

(Continued)

OTHER PUBLICATIONS

"Search Report of Europe Counterpart Application", dated Feb. 16, 2017, p. 1-8.
(Continued)

*Primary Examiner* — Robert W Horn
(74) *Attorney, Agent, or Firm* — JCIPRNET

(57) ABSTRACT

The motor of the invention includes the resin sealing member which covers a stator and a circuit board. The stator includes a stator core for winding a driving coil through an insulation member, and a terminal pin secured to the insulation member. The insulation member includes a press fitting portion for pressing and securing a portion of the terminal pin on a side of a second direction, whereas a portion of the terminal pin on a side of a first direction is soldered to the circuit board. A stopper portion is formed on a second direction end of the terminal pin. The stopper portion contacts a surface of the press fitting portion in the second direction to prevent the terminal pin from falling off in the first direction.

11 Claims, 7 Drawing Sheets

(51) Int. Cl.
*H02K 7/08* (2006.01)
*H02K 11/00* (2016.01)
*H02K 15/10* (2006.01)
*H02K 15/12* (2006.01)
*H02K 3/52* (2006.01)
*H02K 5/128* (2006.01)
*H02K 15/00* (2006.01)
*F04D 13/06* (2006.01)
*F04D 1/00* (2006.01)

(52) U.S. Cl.
CPC ............... *H02K 1/14* (2013.01); *H02K 3/522* (2013.01); *H02K 5/128* (2013.01); *H02K 7/08* (2013.01); *H02K 11/0094* (2013.01); *H02K 15/0056* (2013.01); *H02K 15/10* (2013.01); *H02K 15/12* (2013.01); *F04D 1/00* (2013.01); *H02K 2203/03* (2013.01); *H02K 2203/12* (2013.01)

(56) References Cited

U.S. PATENT DOCUMENTS

| | | | | |
|---|---|---|---|---|
| 9,976,557 | B2* | 5/2018 | Bernreuther | H02K 1/145 |
| 2003/0117935 | A1* | 6/2003 | Utsumi | G11B 5/5582 |
| | | | | 720/702 |
| 2007/0286753 | A1* | 12/2007 | Ihle | H02K 1/145 |
| | | | | 417/423.7 |
| 2008/0031748 | A1* | 2/2008 | Ihle | F04D 29/026 |
| | | | | 417/321 |
| 2017/0093235 | A1* | 3/2017 | Otsubo | H02K 1/14 |
| 2017/0093252 | A1* | 3/2017 | Otsubo | F04D 13/0606 |
| 2017/0126089 | A1* | 5/2017 | Bao | F04D 13/0626 |
| 2017/0222500 | A1* | 8/2017 | Utsumi | F04D 13/064 |
| 2017/0302133 | A1* | 10/2017 | Ehrsam | F04D 29/426 |
| 2018/0083516 | A1* | 3/2018 | Endo | H02K 1/16 |

FOREIGN PATENT DOCUMENTS

| | | |
|---|---|---|
| CN | 102410231 | 4/2012 |
| CN | 103069661 | 4/2013 |
| CN | 103299515 | 9/2013 |
| CN | 103362828 | 10/2013 |
| CN | 103427562 | 12/2013 |
| CN | 104124849 | 10/2014 |
| CN | 206129624 | 4/2017 |
| JP | 2009-033849 | 2/2009 |
| JP | 2011-152815 | 8/2011 |
| JP | 2013-204431 | 10/2013 |

OTHER PUBLICATIONS

"Office Action of China Counterpart Application" dated May 17, 2018, with English translation thereof, p. 1-12.

* cited by examiner

MOTOR AND METHOD FOR MANUFACTURING MOTOR

CROSS-REFERENCE TO RELATED APPLICATIONS

This application claims the priority benefit of Japan application serial no. 2015-193969, filed on Sep. 30, 2015. The entirety of the above-mentioned patent application is hereby incorporated by reference herein and made a part of this specification.

BACKGROUND OF THE INVENTION

1. Field of the Invention

The invention relates to a motor having a stator and a circuit board covered by a resin sealing member. The invention also relates to a method for manufacturing the motor.

2. Description of Related Art

In the conventional technology, a pumping apparatus is known to include a pump chamber disposed with an impeller and a rotor, as well as a stator and a circuit board disposed outside the pump chamber (referring to Patent Document 1). In the pumping apparatus disclosed by Patent Document 1, a partition wall is disposed between the stator and the circuit board to prevent a fluid from flowing into positions where the stator and circuit board are located. The stator and the circuit board are covered by a resin sealing member. The stator is formed in a substantially cylindrical shape, and includes a driving coil, a stator core for winding the driving coil through a bobbin, and a terminal pin for bundling and securing an end portion of the driving coil. The terminal pins are pressed and secured into the bobbin.

Further, in the pumping apparatus disclosed by Patent Document 1, the circuit board is formed in a plate shape and secured to the partition wall by making an axial direction of the stator identical to a thickness direction of the circuit board. The terminal pin is soldered and secured to the circuit board. One fastening projection for securing the circuit board is formed on the partition wall, and the circuit board is secured to said one fastening projection by a screw. When the partition wall is inserted into an inner circumference side of the stator while manufacturing the pumping apparatus disclosed by Patent Document 1, the circuit board is secured to the partition wall and the terminal pin is soldered and secured to the circuit board. Further, after the stator and the circuit board are disposed in a mold in such condition, the partition wall, a resin material is injected into the mold for curing so the resin sealing member may be formed to cover the stator and the circuit board.

PRIOR ART DOCUMENT

Patent Document

Patent Document 1: Japanese Patent Publication No. 2013-204431

SUMMARY OF THE INVENTION

Problems to be Solved by the Invention

In the pumping apparatus disclosed by Patent Document 1, it is preferred to increase an injection pressure for injecting the resin material into the mold when the resin sealing member is formed, so as to cover the stator and the circuit board more reliably by the resin sealing member. Nonetheless, a greater forming pressure will be applied to the circuit board in the plate shape disposed in the mold if the injecting pressure for injecting the resin material into the mold is increased. In the pumping apparatus disclosed by Patent Document 1, the circuit board disposed in the mold is secured to the partition wall through the screw. Therefore, if the injecting pressure for injecting the resin material into the mold becomes higher, a warpage of the circuit board may occur in a direction away from the stator and the partition wall due to a pressure of the resin material flowed in the stator and in between the partition wall and the circuit board. Moreover, if the warpage of the circuit board is overly large, the terminal pins pressed and secured to the bobbin may fall off the bobbin.

To solve said problem, the invention provides a motor. A stator and a circuit board of the motor are covered by a resin sealing member, and have one end side soldered and secured to the circuit board and another end side secured to the terminal pin of an insulation member of the stator. As such, the terminal pin may be prevented from falling off the insulation member when the resin sealing member is formed. In addition, the invention also provides a method for manufacturing said motor.

Technical Means for Solving the Problem

In order to solve aforementioned problem, the motor of the invention includes: a rotor, having a driving magnet; a stator, formed in a tubular shape and disposed on an outer circumference side of the rotor, and having a driving coil; a partition wall member, having a partition wall in a substantially bottomed cylindrical shape disposed between the rotor and the stator; a circuit board, disposed outside the partition wall in an axial direction of the rotor, and secured at a bottom of the partition wall; and a resin sealing member made by a resin, covering the stator and the circuit board. The stator includes: an insulation member; a stator core, having a plurality of salient poles for winding the driving coil through the insulation member; and a plurality of terminal pins, electrically connected to an end portion of the driving coil, and disposed in parallel to the axial direction. If a direction in which the circuit board is disposed relative to the partition wall in the axial direction is set as a first direction and an opposite direction of the first direction is set as a second direction, the circuit board is disposed closer to a side of the first direction than the stator core and the insulation member, a portion of the terminal pin on the side of the first direction is soldered and secured to the circuit board, the insulation member has a press fitting portion for pressing and securing a portion of the terminal pin on a side of the second direction, and a stopper portion is formed on a second direction end of the terminal pin. The stopper portion contacts a surface of the press fitting portion on the side of the second direction known as a second direction surface to prevent the terminal pin from falling off in the first direction.

In the motor of the invention, if a direction in which the circuit board is disposed relative to the partition wall in the axial direction is set as a first direction and an opposite direction of the first direction is set as a second direction, a stopper portion is formed on a second direction end of the terminal pin. The stopper portion contacts a surface of the press fitting portion of the insulation member on the side of the second direction known as a second direction surface to prevent the terminal pin from falling off in the first direction. Therefore, in the invention, even if a great forming pressure is applied between the circuit board and the insulation member when the resin sealing member is formed, the terminal pin may still be prevented from falling off the insulation member. Further, the warpage of the circuit board may be suppressed when the resin sealing member is formed since the terminal pin may be prevented from falling off the insulation member.

In the invention, for example, the stopper portion is a bent portion formed by partially bending the second direction end of the terminal pin. In this case, the stopper portion may be formed after the terminal pin are pressed and secured from the side of the first direction into the press fitting portion.

In the invention, preferably, the stator core includes an outer circumference ring formed in a ring shape and the salient poles protruding from the outer circumference ring toward an inner side of a radial direction of the stator, and the press fitting portion is formed on an axial covering portion. The axial covering portion covers a part of the outer circumference ring from the side of the first direction in a circumferential direction of the stator. Two terminal pins are secured to the press fitting portion in the circumferential direction separating from each other by a pitch, and the axial covering portion includes a reinforcing thick-wall portion. The reinforcing thick-wall portion is disposed between two stopper portions in the circumferential direction and connected to the second direction surface of the press fitting portion. With such configuration, strength of the axial covering portion may still be ensured even if the second direction surface of the press fitting and an end surface of the outer circumference ring in the first direction are made far away from each other in the axial direction in order to dispose the stopper portion. Therefore, the axial covering portion may be suppressed from deformations caused by winding the driving coil to the insulation member.

In the invention, preferably, the stator core includes an outer circumference ring formed in a ring shape and the salient poles protruding from the outer circumference ring toward an inner side of a radial direction of the stator, and the press fitting portion is formed on an axial covering portion. The axial covering portion covers a part of the outer circumference ring from the side of the first direction in a circumferential direction of the stator. The axial covering portion includes a contact covering portion. The contact covering portion is disposed between the outer circumference ring and the second direction surface in the axial direction and contacts the outer circumference ring by covering a part of the outer circumference ring in the circumferential direction. With such configuration, the terminal pin may be prevented from contacting the stator core in case the terminal pin secured to the press fitting portion moves in the second direction. As a result, the driving coil and the stator core may be prevented from short circuit.

In the invention, preferably, the stopper portion is a bent portion formed by partially bending the second direction end of the terminal pin, and a length of the bent portion is shorter than a space between the press fitting portion and the contact covering portion in the axial direction. With such configuration, the stopper portion may be formed after the terminal pin are pressed and secured from the side of the first direction into the press fitting portion. Therefore, the stopper portion may still be formed on the terminal pin even if the contact covering portion is formed on the axial covering portion.

In the invention, preferably, two terminal pins are secured to the press fitting portion in the circumferential direction of the stator separating from each other by a pitch, two pressing holes for pressing the two terminal pins into are formed on the press fitting portion, and the pressing holes are formed to penetrate a surface of the press fitting from the side of the first direction to the second direction surface.

In the invention, preferably, the stopper portion is a bent portion formed by partially bending the second direction end of the terminal pin, the stator core includes an outer circumference ring formed in a ring shape and the salient poles protruding from the outer circumference ring toward the inner side of the radial direction of the stator, and the press fitting portion is formed on an axial covering portion. The axial covering portion covers a part of the outer circumference ring from the side of the first direction in a circumferential direction of the stator. Two terminal pins are secured to the press fitting portion in the circumferential direction separating from each other by a pitch, and the axial covering portion includes a reinforcing thick-wall portion. The reinforcing thick-wall portion is disposed between two bent portions in the circumferential direction and connected to the second direction surface of the press fitting portion, and the bent portion is bent towards the reinforcing thick-wall portion.

In the invention, preferably, the stator core includes an outer circumference ring formed in a ring shape and the salient poles protruding from the outer circumference ring toward an inner side of a radial direction of the stator, and the press fitting portion is formed on an axial covering portion. The axial covering portion covers a part of the outer circumference ring from the side of the first direction in a circumferential direction of the stator. Two terminal pins are secured to the press fitting portion in the circumferential direction separating from each other by a pitch, and the axial covering portion includes a contact covering portion and includes a reinforcing thick-wall portion. The contact covering portion is disposed between the outer circumference ring and the second direction surface in the axial direction and contacts the outer circumference ring by covering a part of the outer circumference ring in the circumferential direction. The reinforcing thick-wall portion is disposed between two stopper portions in the circumferential direction and connected to the second direction surface of the press fitting portion and the contact covering portion.

A method for manufacturing the motor of the invention is also provided. The method for manufacturing the motor includes: an insulation member installing process for installing the insulation member on the stator core; a first pressing process for pressing the terminal pin into the press fitting portion after the insulation member installing process; a coil winding process for winding and bundling the end portion of the driving coil to the terminal pin and winding the driving coil to the salient pole through the insulation member after the first pressing process; a soldering process for soldering and securing the end portion of the driving coil to the terminal pins after the coil winding process; a second pressing process for pressing the terminal pin further into the press fitting portion after the soldering process; and a bent portion forming process for partially bending the second direction end of the terminal pin after the second pressing process. In the manufacturing method, the stopper portion may still be formed on the terminal pin even if the contact covering portion is formed on the axial covering portion. Further, in the second pressing process according to the manufacturing method, the terminal pin is further pressed into the press fitting portion. Therefore, a tension of the driving coil between the terminal pin and the salient pole may be released. As a result, a breakage of the driving coil between the terminal pin and the salient pole may be prevented.

Effects of the Invention

As described above, the stator and the circuit board of the motor are covered by the resin sealing member, and have one end side soldered and secured to the circuit board and another end side secured to the terminal pin of the insulation member of the stator in the motor of the invention. As such, the terminal pin may be prevented from falling off the insulation member when the resin sealing member is formed. Also, in the method for manufacturing the motor according to the invention, even if the contact covering portion is formed on the axial covering portion, the stopper portion may still be formed for the terminal pin, and the breakage of the driving coil between the terminal and the stopper portion may still be prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7(A) shows the condition after the first pressing process is completed and FIG. 7(B) shows the condition after the second pressing process is completed.

DESCRIPTION OF THE EMBODIMENTS

Figure 1:
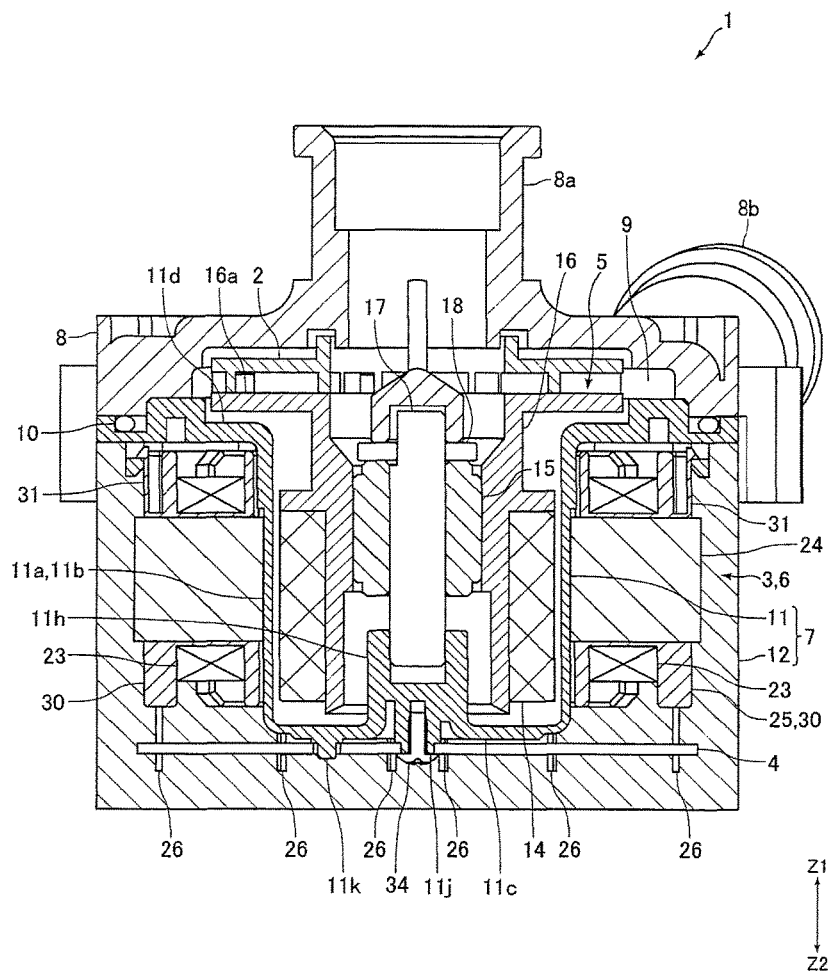
FIG. 1 is a sectional view of a pumping apparatus installed with a motor according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the invention are described below with reference to the accompanying drawings.

(Overall Structure of Pumping Apparatus)

Figure 2:
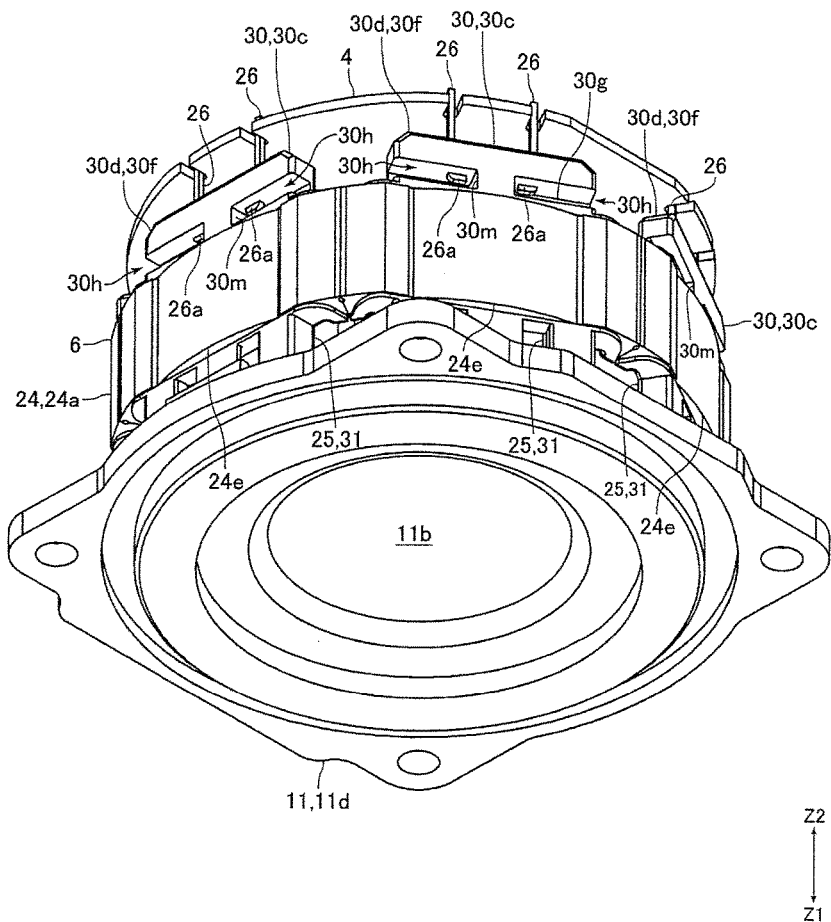
FIG. 2 is a 3D view of a circuit board, a stator and a partition wall member shown in FIG. 1.
Figure 3:
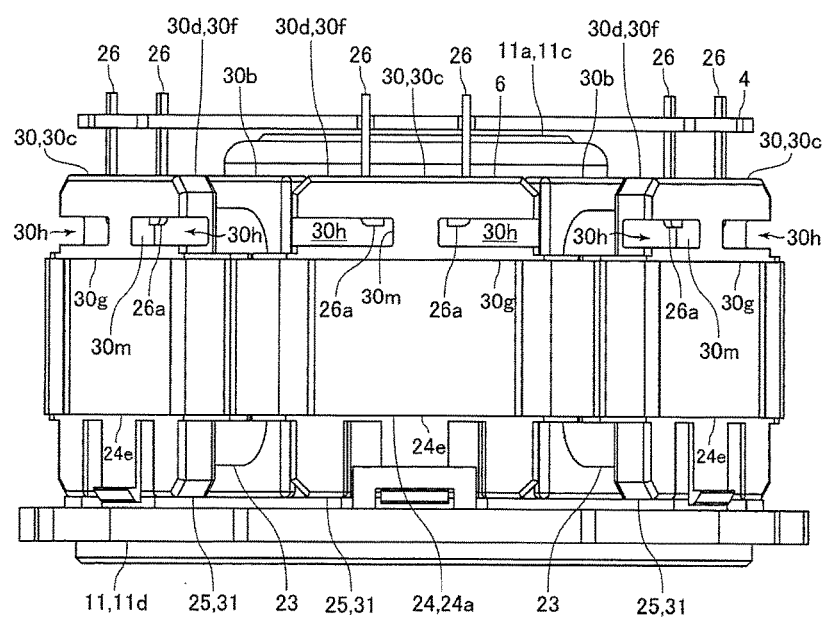
FIG. 3 is a side view of the circuit board, the stator and the partition wall member shown in FIG. 2.

FIG. 1 is a sectional view of a pumping apparatus 1 installed with a motor 3 according to an embodiment of the invention. FIG. 2 is a 3D view of a circuit board 4, a stator 6 and a partition wall member 11 shown in FIG. 1. FIG. 3 is a side view of the circuit board 4, the stator 6 and the partition wall member 11 shown in FIG. 2. Further, in the following description, an upper side of FIG. 1 (a side of a Z1 direction) is set as an "upper side", and a lower side of FIG. 1 (a side of a Z2 direction) is set as a "lower side".

The motor 3 of the present embodiment is installed in the pumping apparatus 1 known as a canned pump (or canned motor pump). The pumping apparatus 1 includes an impeller 2 which rotates by using power provided by the motor 3. Further, the motor 3 includes a rotor 5, the stator 6, and the circuit board 4 for controlling the motor 3. The impeller 2, the rotor 5, the stator 6 and the circuit board 4 are disposed inside a case body including a housing 7 and a case 8. The housing 7 constitutes a part of the motor 3, and the case 8 covers an upper portion of the housing 7. The housing 7 and the case 8 are secured to each other through a screw, which is not illustrated in the drawing.

A (fluid) inlet portion 8a and a (fluid) outlet portion 8b are formed on the case 8. A pump chamber 9 is formed between the housing 7 and the case 8 for allowing the fluid flowed from the inlet portion 8a to pass through to the outlet portion 8b. Further, a sealing member (an O-ring) 10 is disposed on an engaged portion of the housing 7 and the case 8 for ensuring a sealing integrity of the pump chamber 9. The housing 7 includes: a partition wall member 11, having a partition wall 11a disposed between the pump chamber 9 and the stator 6 to separate the pump chamber 9 from the stator 6; and a resin sealing member 12 made by a resin, covering a lower surface and a lateral side of the partition wall member 11.

The rotor 5 includes a driving magnet 14, a sleeve 15 in a cylindrical shape, and a holding member 16 for holding the driving magnet 14 and the sleeve 15. The holding member 16 is formed in a substantially cylindrical shape with flange. The driving magnet 14 is secured to an outer circumference side of the holding member 16 and the sleeve 15 is secured to an inner circumference side of the holding member 16. The impeller 2 is secured to a flange portion 16a disposed on the upper side of the holding member 16. The impeller 2 and the rotor 5 are disposed inside the pump chamber 9.

The rotor 5 is rotatably supported by a fixing shaft 17. The fixing shaft 17 is disposed by making an axial direction of the fixing shaft 17 identical to an upward/downward direction. That is, the upward/downward direction is an axial direction of the rotor 5. An upper end of the fixing shaft 17 is held at the case 8, and a lower end of the fixing shaft 17 is held at the housing 7. The fixing shaft 17 is inserted into an inner circumference side of the sleeve 15. Further, a thrust bearing member 18 in close contact with an upper end surface of the sleeve 15 is installed on the fixing shaft 17. In the present embodiment, the sleeve 15 can function as a radial bearing of the rotor 5, and the sleeve 15 and the thrust bearing member 18 together can function as a thrust bearing of the rotor 5.

The stator 6 includes a driving coil 23, a stator core 24 and an insulator 25 serving as an insulation member, which are integrally formed in a tubular shape. Specifically, the stator 6 is formed in a substantially cylindrical shape. The stator 6 is disposed on an outer circumference side of the rotor 5 through the partition wall 11a. That is, the partition wall 11a is disposed between the rotor 5 and the stator 6. Also, the stator 6 is disposed by making an axial direction of the stator 6 identical to the upward/downward direction.

Further, the stator 6 includes a plurality of terminal pins 26 for bundling and electrically connecting an end portion of the driving coil 23. The terminal pin 26 is disposed by making a long edge direction of the terminal pin 26 identical to the upward/downward direction. That is, the terminal pin 26 is disposed in parallel to the upward/downward direction. Specific structure of the stator 6 will be described in more detail later. In addition, in the following description, axial directions of the rotor 5 and the stator 6 are set as "an axial direction", and circumferential directions (directions of circumferences) of the rotor 5 and the stator 6 are set as "a circumferential direction".

As described above, the partition wall member 11 includes the partition wall 11a. The partition wall 11a is fainted in a substantially bottomed cylindrical shape with flange, and includes a cylindrical portion 11b, a bottom 11c and a flange portion 11d. The cylindrical portion 11b is formed in a cylindrical shape, and disposed by covering an outer circumference of the driving magnet 14. The bottom 11c is formed in a circular plate shape for sealing a lower end of the cylindrical portion 11b. The flange portion 11d is formed expending from an upper end of the cylindrical portion 11b to an outer side of the radial direction.

A shaft holding portion 11h for holding the lower end side of the fixing shaft 17 is formed on an upper surface of the bottom 11c by protruding to the upper side. A securing projection 11j for securing the circuit board 4 to the partition wall member 11 is formed on a lower surface of the bottom 11c by protruding to the lower side. The securing projection 11j is formed at a center of the lower surface of the bottom 11c. Further, a positioning projection 11k for positioning the circuit board 4 is formed on the lower surface of the bottom 11c by protruding to the lower side. As shown in FIG. 1, an inner side and an upper side of the partition wall 11a become the pump chamber 9, and the impeller 2 and the rotor 5 are disposed on the inner side and the upper side of the partition wall 11a. The partition wall 11a functions to prevent the fluid in the pump chamber 9 from flowing into places where the stator 6 and the circuit board 4 are disposed.

The circuit board 4 is formed in a plate shape by using a rigid substrate, such as a glass epoxy substrate. The circuit board 4 is disposed closer to the lower side than the driving coil 23, the stator core 24 and the insulator 25 by making an axial direction of the stator identical to a thickness direction of the circuit board 4 in the upward/downward direction. Further, after being positioned by the securing projection 11j and the positioning projection 11k in the radial direction, the circuit board 4 is secured by a screw 34 screwed into the securing projection 11j. That is, the circuit board 4 is secured at the bottom 11c closer to the lower side than the bottom 11c (i.e., outside the partition wall 11a in the upward/downward direction), and the circuit board 4 is disposed outside the pump chamber 9. Furthermore, illustrations of the securing projection 11j, the positioning projection 11k and the screw 34 are omitted in FIG. 3.

A lower end side portion of the terminal pin 26 is soldered and secured to the circuit board 4. That is, the driving coil 23 is electrically connected to the circuit board 4 through the terminal pin 26. In the present embodiment, a downward direction (the Z2 direction) is a direction in which the circuit board 4 is disposed relative the partition wall 11a in the axial direction of the stator 6 also known as a first direction, and an upward direction (the Z1 direction) is an opposite direction of the first direction known as a second direction.

The resin sealing member 12 is disposed to completely cover the circuit board 4 and the driving coil 23 in order to protect the circuit board 4 and the driving coil 23 from damages cause by the fluid. The resin sealing member 12 is integrally formed in a substantially bottomed cylindrical shape to completely cover the circuit board 4, the stator 6, the cylindrical portion 11b and the bottom 11c. Further, the resin sealing member 12 covers a lower surface of the flange portion 11d.

(Structure of Stator)

Figure 4:
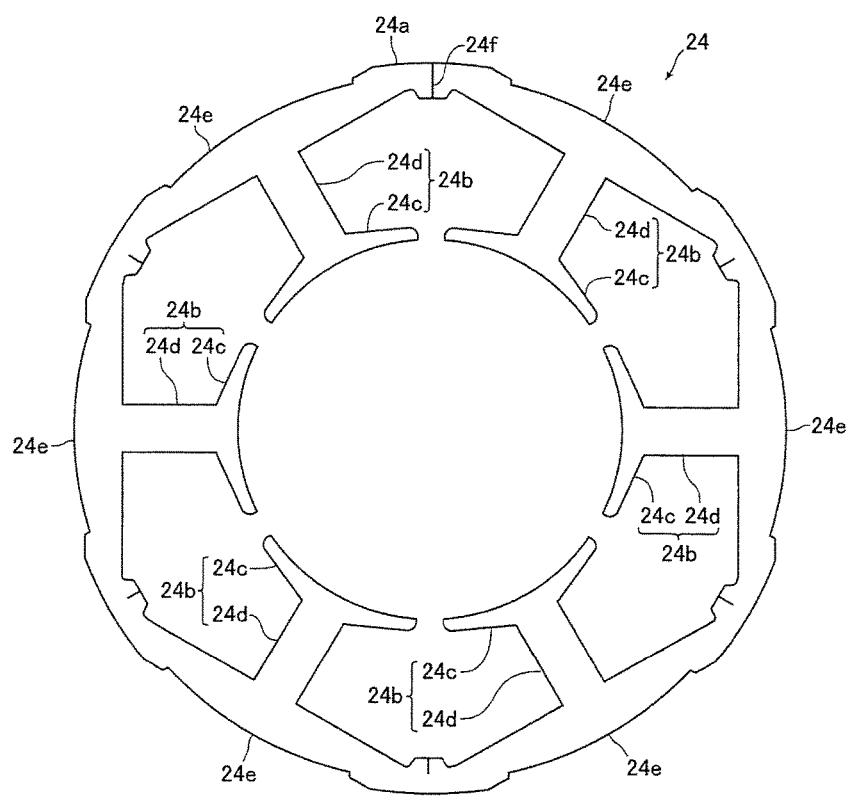
FIG. 4 is a plan view of the stator core shown in FIG. 2.
Figure 5A:
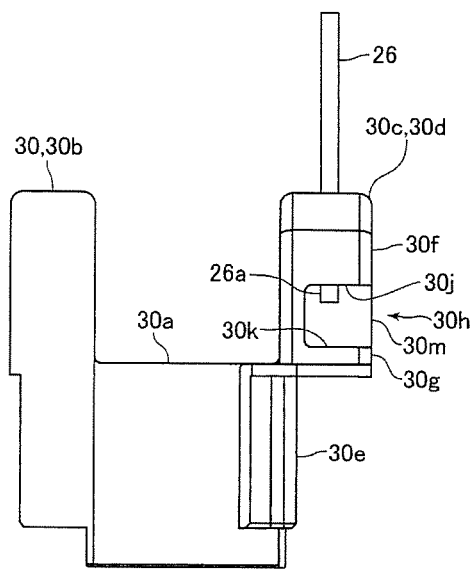
FIG. 5(A) is a side view of a first insulator and the terminal pin shown in FIG. 2.
Figure 5B:
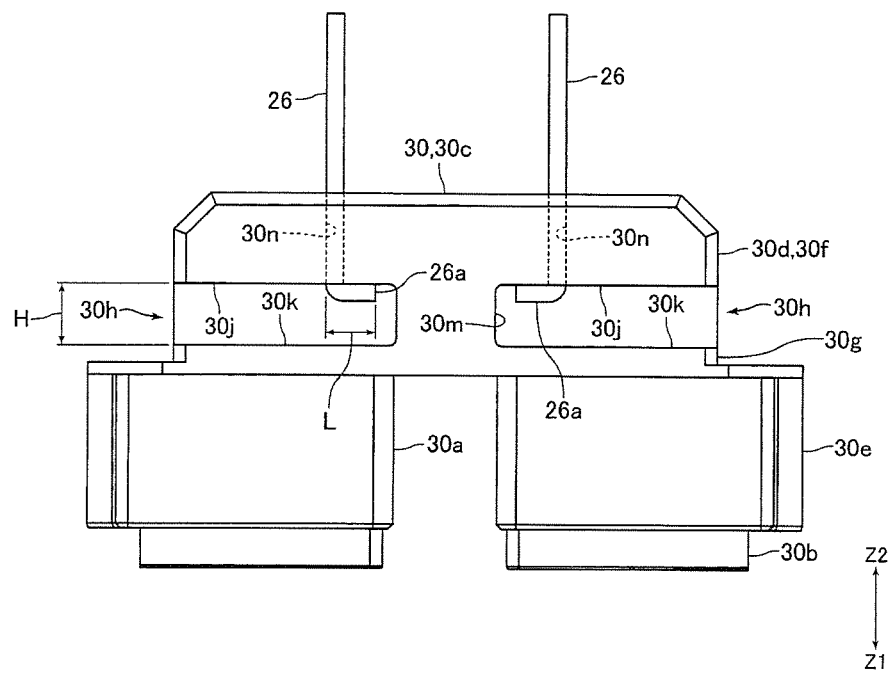
FIG. 5(B) is a front view of the first insulator and the terminal pin shown in FIG. 2.

FIG. 4 is a plan view of the stator core 24 shown in FIG. 2. FIG. 5(A) is a side view of a first insulator 30 and the terminal pin 26 shown in FIG. 2, and FIG. 5(B) is a front view of the first insulator 30 and the terminal pin 26 shown in FIG. 2.

As described above, the stator 6 includes the driving coil 23, the stator core 24, the insulator 25 and the terminal pins 26. The stator core 24 is a stacked-layer core material formed by stacking thin magnetic plates containing magnetic material. As shown in FIG. 4, the stator core 24 includes an outer circumference ring 24a formed in a ring shape and a plurality of salient poles 24b protruding from the outer circumference ring 24a toward an inner side of the radial direction. In the present embodiment, the stator core 24 includes six salient poles 24b. Each of the six salient poles 24b is formed to include an equal angular pitch, and disposed with a predetermined pitch from one another in the circumferential direction. In addition, the number of the salient poles 24b included by the stator core 24 may also be a number different other than six. Further, it is possible that the stator core 24 is not the stacking layer core material.

The outer circumference ring 24a is formed to include the ring shape as described below: a substantially circular shape as a shape of the outer circumference when inspecting from the upward/downward direction; and a substantially hexagon shape as a shape of the inner circumference when inspecting from the upward/downward direction. The outer circumference of the outer circumference ring 24a constitutes an outer circumference of the stator core 24. Further, the outer circumference ring 24a includes six outer circumference portions 24e. That is, the outer circumference ring 24a includes the same number of the salient poles 24b and the outer circumference portions 24e. One outer circumference portion 24e is formed by a part of the outer circumference ring 24a in the circumferential direction, which is a portion between one vertex of the outer circumference of the outer circumference ring 24a in the substantially hexagon shape when inspecting from the upward/downward direction and another vertex adjacent to the vertex. That is, one outer circumference portion 24e is formed by a part of the outer circumference ring 24a in the circumferential direction, which is a portion corresponding to an edge of the outer circumference of the outer circumference ring 24a in the substantially hexagon shape when inspecting from the upward/downward direction.

The salient pole 24b is formed at a center of the outer circumference portion 24e in the circumferential direction. Further, the salient pole 24b includes a front end portion of the salient pole 24b known as a salient pole front portion 24c and a connecting portion 24d for connecting the salient pole front portion 24c and the outer circumference ring 24a together. When inspecting from the upward/downward direction, the salient pole front portion 24c is formed in a substantially arc shape extended from a front end (an inner end of the radial direction) of the connecting portion 24d formed in a straight line shape to two sides of the circumferential direction. An inner surface of the salient pole front end 24c in the radial direction faces the outer circumference of the driving magnet 14 with the cylindrical portion 11b in the middle.

Further, the stator core 24 is a curling core material formed by bending border portions of the six outer circumference portions 24e in form of a straight line (referring to FIG. 6) and then connecting end portions of the outer circumference portion 24e and the outer circumference portion 24e together. That is, the stator core 24 is formed in the ring shape by connecting the end portions of the following core materials. Said core materials include a ribbon core material for forming the outer circumference ring 24a and the six salient poles 24b rising from one surface of the ribbon core material. As such, as shown in FIG. 4, a joint 24f is formed at one position on a portion between two outer circumference portions 24e in the circumferential direction.

The insulator 25 is formed by an insulation material, such as a resin. The insulator 25 is installed corresponding to each of the salient poles 24b, and the stator 6 includes six insulators 25. That is, the stator 6 includes the same number of the salient poles 24 and the insulators 25. Further, the insulator 25 is formed in a tubular shape with flange having flange portions at two ends, and installed on the salient pole 24b by making the axial direction of the insulator 25 formed in the tubular shape identical to the radial direction of the stator 6.

Further, the insulator 25 includes the first insulator 30 and a second insulator 31, which may be divided along the upward/downward direction. The insulator 25 is formed by assembling the first insulator 30 and the second insulator 31 together. The first insulator 30 is disposed on the lower side, and the second insulator 31 is disposed on the upper side.

The first insulator 30 includes: a lower half tubular portion 30a with four side grooves, covering a lateral side of a lower end side portion of the connecting portion 24d and a lower surface of the connecting portion 24d; an inner flange portion 30b, connected to an inner end of the lower half tubular portion 30a in the radial direction; and an outer flange portion 30c, connected to an outer end of the lower half tubular portion 30a in the radial direction. The inner flange portion 30b is formed in a flange shape expended from the inner end of the lower half tubular portion 30a in the radial direction towards two sides and the lower side of the circumferential direction, and covers a lower end surface of the salient pole front portion 24c and the outer circumference side of a lower end side portion of the salient pole front portion 24c.

The outer flange portion 30c is formed in a flange shape expended from the outer end of the lower half tubular portion 30a in the radial direction towards two sides and the lower side of the circumferential direction, and includes an axial covering portion 30d covering a part of the outer circumference portion 24e (i.e., a part of the outer circumference ring 24a in the circumferential direction) from the lower side and a radial covering portion 30e covering a part of the lower end side portion of the outer circumference portion 24e from the inner circumference side (the inner side of the radial direction). That is, the outer flange portion 30c covers a part of a lower end surface of the outer circumference portion 24e and a part of the inner circumference side of the lower end side portion of the outer circumference portion 24e. The axial covering portion 30d is formed by connecting with a lower end of the radial covering portion 30e.

The axial covering portion 30d includes a press fitting portion 30f for pressing and securing an upper portion of the terminal pin 26, and a contact covering portion 30g in contact with the lower end surface of the outer circumference portion 24e by covering a part of the outer circumference portion 24e. The press fitting portion 30f is disposed closer to the lower side than the contact covering portion 30g to constitute a lower end side portion of the axial covering portion 30d. Further, the contact covering portion 30g constitutes an upper end side portion of the axial covering portion 30d. Two recesses 30h caved in from an outer side of radial direction of the axial covering portion 30d toward the inner side of the radial direction is formed between the press fitting portion 30f and the contact covering portion 30g in the upward/downward direction. The two recesses 30h are respectively formed from two ends of the axial covering portion 30d in the circumferential direction toward the inner side of the circumferential direction.

A lower end surface of the press fitting portion 30f (a lower end surface of the axial covering portion 30d) and an upper end surface of the contact covering portion 30g (i.e., an upper end surface of the axial covering portion 30d) are formed in planar shapes orthogonal to each other in the upward/downward direction. Further, the recesses 30h are formed to include four side grooves, as shown in FIG. 5. An upper end surface 30j of the press fitting portion 30f and a lower end surface 30k of the contact covering portion 30g are formed in planar shapes orthogonal to each other in the upward/downward direction. The press fitting portion 30f is formed in a substantially cuboid shape that is thin and long in the circumferential direction. The contact covering portion 30g is formed in a substantially rectangle plate shape that is thin and long in the circumferential direction. The contact covering portion 30g is disposed closer to the upper side than the press fitting portion 30f, and disposed between the outer circumference ring 24a and the upper end surface 30j of the press fitting portion 30f in the upward/downward direction. In the present embodiment, the upper end surface 30j becomes a surface of the press fitting portion 30f on a side of the second direction also known as a second direction surface.

A reinforcing thick-wall portion 30m is provided between the recesses 30h in the circumferential direction. A lower end of the reinforcing thick-wall portion 30m is connected to the upper end surface 30j of the press fitting portion 30f, and an upper end of the reinforcing thick-wall portion 30m is connected to the lower end surface 30k of the contact covering portion 30g. The reinforcing thick-wall portion 30m is disposed at a center position of the axial covering portion 30d in the circumferential direction. A radial thickness of the press fitting portion 30f, a radial thickness of the contact covering portion 30g and a radial thickness of the reinforcing thick-wall portion 30m are equal.

Two terminal pins 26 are secured to the press fitting portion 30f in the circumferential direction separating from each other by a pitch. That is, as shown in FIG. 5(B), two pressing holes 30n for pressing the terminal pins 26 into are formed on the press fitting portion 30f. The pressing hole 30n is formed to penetrate the press fitting portion 30f in the upward/downward direction. That is, the pressing hole 30n is formed to penetrate a surface of the press fitting portion 30f from a side of the first direction to the second direction surface (i.e., the upper end surface 30j). The two pressing holes 30n are respectively formed on two sides of the reinforcing thick-wall portion 30m in the circumferential direction by sandwiching the reinforcing thick-wall portion 30m in the circumferential direction. The terminal pin 26 is, for example, formed in a long quadrangular shape. The terminal pin 26 is secured to the press fitting portion 30f with the upper end side portion of the terminal pin 26 protruding further to the upper side than the upper end surface 30j of the press fitting portion 30f.

A stopper portion 26a is formed on the upper end of the terminal pin 26. The stopper portion 26a contacts the upper end surface 30j of the press fitting portion 30f to prevent the terminal pin 26 from falling off in the downward direction. In the present embodiment, the stopper portion 26a is a bent portion faulted by partially bending the upper end side portion of the terminal pin 26. Therefore, hereinafter, the stopper portion 26a is also known as "the bent portion 26a". The bent portion 26a is bent towards to the reinforcing thick-wall portion 30m. That is, the two bent portions 26a are inwardly bent in the circumferential direction so the upper end side portion of the terminal pin 26 shows a substantially L shape. In addition, in the example of FIG.

5(B), although the bent portion 26a is illustrated as being bent in 90°, a bending angle of the bent portion 26a only needs to fall within a range of 45° to 90°, for example.

A length L of the bent portion 26a (referring to FIG. 5(B)) is shorter than a space H between the upper end surface 30j of the press fitting portion 30f and the lower end surface 30k of the contact covering portion 30g (referring to FIG. 5(B)) in the upward/downward direction. That is, the length L of the bent portion 26a is shorter than the space H between the press fitting portion 30f and the contact covering portion 30g in the upward/downward direction. As described above, the two pressing holes 30n are respectively formed on the two sides of the reinforcing thick-wall portion 30m in the circumferential direction by sandwiching the reinforcing thick-wall portion 30m in the circumferential direction, and the reinforcing thick-wall portion 30m is disposed between the two bent portions 26a in the circumferential direction.

The second insulator 31 includes: an upper half tubular portion with four side grooves, covering a lateral side of an upper end side portion of the connecting portion 24d and an upper surface of the connecting portion 24d; an inner flange portion, connected to an inner end of the upper half tubular portion in the radial direction; and an outer flange portion, connected to an outer end of the upper half tubular portion in the radial direction. The inner flange portion of the second insulator 31 is formed in a flange shape expended from the inner end of the upper half tubular portion in the radial direction towards two sides and the upper side of the circumferential direction, and covers an upper end surface of the salient pole front portion 24c and the outer circumference side of an upper end side portion of the salient pole front portion 24c. The outer flange portion of the second insulator 31 is formed in a flange shape expended from the outer end of the upper half tubular portion in the radial direction towards two sides and the upper side of the circumferential direction, and covers a part of an upper end surface of the outer circumference ring 24a and a part of the inner circumference side of the upper end side portion of the outer circumference ring 24a.

The driving coil 23 includes a wiring containing aluminum alloy or copper alloy. The driving coil 23 is wound on the salient pole 24b through the insulator 25. Specifically, the driving coil 23 is wound to the connecting portion 24d through the lower half tubular portion 30a and the upper half tubular portion of the second insulator 31. One end portion of the driving coil 23 is bundled and secured to one of the two terminal pins 26 secured on the first insulator 30. Another end portion of the driving coil 23 is bundled and secured to another one of the two terminal pins 26.

(Method for Manufacturing the Motor)

Figure 6:
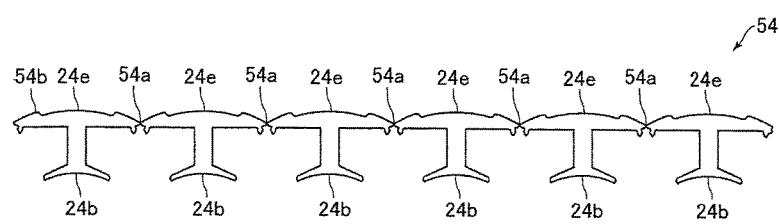
FIG. 6 is a plan view of a core material for making the stator core shown in FIG. 4.

FIG. 6 is a plan view of a core material 54 for making the stator core 24 shown in FIG. 4. FIG. 7 is a diagram illustrating an installation of the stator 6 shown in FIG. 2.

The motor 3 is manufactured by the following method. First of all, the insulator 25, serving as the insulation member, is installed on the core material 54 (referring to FIG. 6) for making the stator core 24 (an insulation member installing process). As shown in FIG. 6, the core material 54 includes: a ribbon portion 54b in a straight line shape, including six outer circumference portions 24e connected through bending portions 54a; and six salient poles 24b, respectively protruding from the six outer circumference portions 24e in a direction orthogonal to a long edge direction of the ribbon portion 54b. In the insulation member installing process, the insulator 25 is installed on each of the six outer circumference portions 24e and each of the six salient poles 24b. Specifically, on each of the six outer circumference portions 24e and each of the six salient poles 24b, the first insulator 30 is installed from the lower side, and the second insulator 31 is installed from the upper side.

Figure 7A:
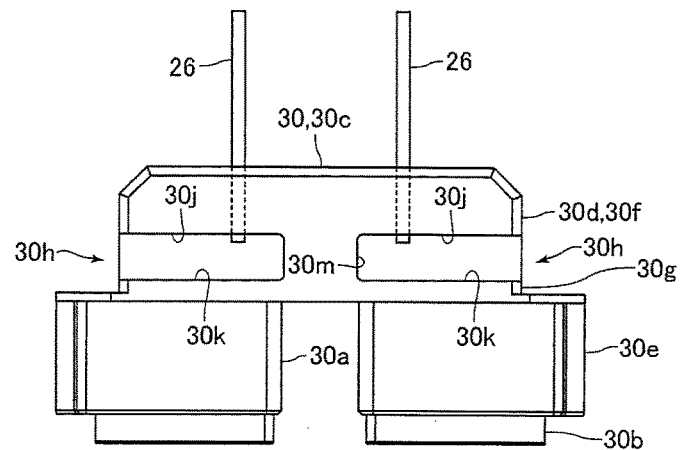
FIG. 7(A) and FIG. 7(B) are diagrams for illustrating a method for installing the stator shown in FIG. 2, where

Then, as shown in FIG. 7(A), the two terminal pins 26 are respectively pressed into the press fitting portion 30f of each of six first insulators 30 (a first pressing process). In the first pressing process, the terminal pin 26 is temporarily pressed into the pressing hole 30n of the press fitting portion 30f. Then, after one end portion of the driving coil 23 is bundled and wound to a lower end side of one terminal pin 26 among the two terminal pins 26 temporarily pressed in the pressing hole 30n and the driving coil 23 is wound to the salient pole 24b through the lower half tubular portion 30a of the first insulator 30 and the upper half tubular portion of the second insulator 31, another end portion of the driving coil 23 is wounded and bundled to a lower end side of another terminal pin 26 among the two terminal pins 26 (a coil winding process).

Figure 7B:
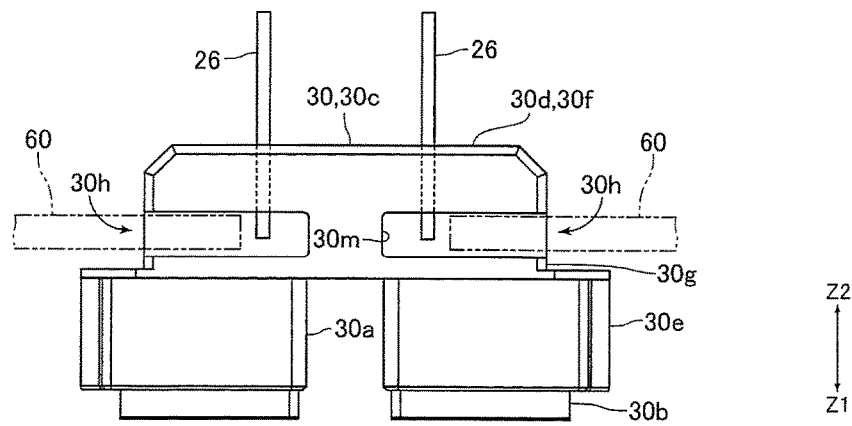

Then, the terminal pin 26 and the end portion of the driving coil 23 are soldered and secured (a soldering process). Then, as shown in FIG. 7(B), the terminal pin 26 is further pressed into the press fitting portion 30f in the upward direction (a second pressing process). Then, the upper end side portion of the terminal pin 26 is partially bent to form the bent portion 26a (a bent portion forming process). In the bent portion forming process, as shown in FIG. 7(B), a jig 60 (for bending) is inserted into the recesses 30h from two end sides of the recesses 30h, so the jig 60 can bend the upper end side portion of the terminal pin 26 to form the bent portion 26a. The jig 60 is driven by, for example, air pressure.

Then, the ribbon portion 54b is bent at the bending portions 54a to turn the ribbon portion 54b in the straight line shape into the outer circumference ring 24a in the ring shape and to make the salient poles 24b protrude toward the inner side of the radial direction of the outer circumference ring 24a, and then end portions of the ribbon portions 54b are connected to each other through welding or the like (a salient pole forming process). The stator 6 is made when the stator core forming process is completed. Further, the stator core forming process may be performed before the bent portion forming process.

Then, the cylindrical portion 11b of the partition wall 11a is inserted into the inner circumference side of the stator 6, the circuit board 4 is secured at the bottom 11c through the screw 34, and the terminal pins 26 are soldered and secured to the circuit board 4. Then, the partition wall member 11 secured with the secured circuit board 4 and the stator 6 is disposed in a mold and cured by injecting a resin material into the mold, so as to form the resin sealing member 12. That is, the resin sealing member 12 is formed by injecting the resin material into the partition wall member 11 secured with the secured circuit board 4 and the stator 6. Then, the rotor 5 is installed on the inner circumference side of the cylindrical portion 11b. The motor 3 is completed when the rotor 5 is installed. Then, the pumping apparatus 1 is completed when the impeller 2 is secured to the holding member 16 and the case 8 is secured to the housing 7.

(Main Effects of the Present Embodiment)

As described in the foregoing description, in the present embodiment, the bent portion 26a is formed on the upper end of the terminal pin 26. The bent portion 26a contacts the upper end surface 30j of the press fitting portion 30f to prevent the terminal pin 26 from falling off in the downward direction. Therefore, according to the present embodiment, even if the great forming pressure is applied between the circuit board 4 and the first insulator 30 when the resin sealing member 12 is formed, the terminal pin 26 may still be prevented from falling off the first insulator 30. Further, in the present embodiment, a warpage of the circuit board 4 may be suppressed when the resin sealing member 12 is formed since the terminal pin 26 may be prevented from falling off the first insulator 30.

In the present embodiment, the contact covering portion 30g is disposed on the upper side of the press fitting portion 30f. The contact covering portion 30g contacts the lower end surface of the outer circumference portion 24e by covering a part of the outer circumference portion 24e. Therefore, in the present embodiment, the terminal pin 26 may be prevented from contacting the stator core 24 in case the terminal pin 26 secured to the press fitting portion 30f moves towards the upper side. Therefore, in the present embodiment, the driving coil 23 and the stator core 24 may be prevented from short circuit in case the terminal pin 26 secured to the press fitting portion 30f moves towards the upper side.

In the present embodiment, the stopper portion 26a is the bent portion 26a fondled by partially bending the upper end side portion of the terminal pin 26. The length L of the bent portion 26a is shorter than the space H between the press fitting portion 30f and the contact covering portion 30g in the upward/downward direction. Therefore, in the present embodiment, the bent portion 26a may still be formed after the terminal pin 26 is pressed and secured from the lower side into the press fitting portion 30f even if the contact covering portion 30g is formed on the axial covering portion 30d. That is to say, in the present embodiment, the stopper portion 26a may still be formed on the terminal pin 26 even if the contact covering portion 30g is formed on the axial covering portion 30d.

In the present embodiment, the reinforcing thick-wall portion 30m is formed on the axial covering portion 30d. The lower end of the reinforcing thick-wall portion 30m is connected to the upper end surface 30j of the press fitting portion 30f, whereas the upper end is connected to the lower end surface 30k of the contact covering portion 30g. Therefore, in the present embodiment, strength of the axial covering portion 30d may still be ensured even if two recesses 30h are formed in order to dispose the bent portion 26a of the terminal pin 26. As a result, the axial covering portion 30d may be suppressed from deformations caused by winding the driving coil 23 to the insulator 25.

In the first pressing process according to the present embodiment, the driving coil 23 is wounded after temporarily pressing the terminal pin 26 into the press fitting portion 30f. Then, after the terminal pin 26 and the end portion of the driving coil 23 are soldered and secured, the terminal pint 26 is further pressed into the press fitting portion 30f in the second pressing process. Therefore, in the present embodiment, a tension of the driving coil 23 between the terminal pin 26 and the salient pole 24b may be released. As a result, a breakage of the driving coil 23 between the terminal pin 26 and the salient pole 24 may be prevented.

(Other Embodiments)

The foregoing embodiment is an example of the more preferred embodiment of the invention rather than limitations to the invention. Various modifications may be made without changing the spirit in the scope of the subject matters in the invention.

In the foregoing embodiment, the press fitting portion 30f is formed on the axial covering portion 30d of the outer flange portion 30c. However, the press fitting portion 30f may also be formed on the inner flange portion 30b. That is to say, the terminal pin 26 may also be pressed and secured into the inner flange portion 30b. Further, in the foregoing embodiment, the reinforcing thick-wall portion 30m is formed on the axial covering portion 30d. However, as long as the strength of the axial covering portion 30d may be ensured, it is not required to form the reinforcing thick-wall portion 30m on the axial covering portion 30d. Furthermore, in the foregoing embodiment, the contact covering portion 30g is formed on the axial covering portion 30d. However, as long as the resin material for making the resin sealing member 12 may be reliably flowed into the recesses 30h when the resin sealing member 12 is formed, it is not required to form the contact covering portion 30g on the axial covering portion 30d.

In the foregoing embodiment, the stopper portion 26a of the terminal pin 26 is the bent portion 26a. However, the stopper portion 26a may also be formed in a stick shape, a plate shape or a ball shape, etc., instead of the stopper portion 26a being the bent portion 26a. In this case, as long as the stopper portion 26a may be formed after the terminal pin 26 is pressed from the lower side into the press fitting portion 30f, the contact covering portion 30g may also be formed on the axial covering portion 30d. On the other hand, under the circumstance where the stopper portion 26a cannot be formed after the terminal pin 26 is pressed from the lower side into the press fitting portion 30f, the contact covering portion 30g is not formed on the axial covering portion 30d. For example, after the stopper portion 26a is pre-formed before the terminal pin 26 is pressed into the press fitting portion 30f, the terminal pin 26 is then pressed into the press fitting portion 30f from the upper side. Further, in the foregoing embodiment, if the contact covering portion 30g is not formed on the axial covering portion 30d, the terminal pin 26 pre-formed with the bent portion 26a is pressed into the press fitting portion 30f from the upper side. In this case, the terminal pin 26 is pressed into the press fitting portion 30f before the insulation member installing process.

In the foregoing embodiment, the driving coil 23 is wound after the insulator 25 is installed on the stator core 24b of the stator core 24. However, the driving coil 23 may also wounded to a bobbin in the tubular shape with flange serving as the insulation member first before the bobbin wounded with the driving coil 23 is installed on the salient pole of the stator core. In this case, the press fitting portion for pressing and securing the upper end side portion of the terminal pin 26 into is formed on the bobbin.

In the foregoing embodiment, the stator core 24 is the curling core material. However, the stator core 24 may also by a so-called divided core material which is formed by assembling a plurality of core materials divided in the circumferential direction. Further, the stator core 24 may also be an integrated ring core material formed by stacking thin magnetic plates in a ring shape. Further, in the foregoing embodiment, each the six first insulators 30 and each of the six second insulators 31 are installed on each of the six salient poles 24b, and the first insulator 30 and the second insulator 31 are divided in correspondence to each of the salient poles 24b. However, the six first insulators 30 may be integrally formed and the six second insulators 31 may be integrally formed. Further, in the foregoing embodiment, the motor 3 is used in the pumping apparatus 1. Nevertheless, the motor 3 may also be used in apparatuses other than the pumping apparatus 1.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motor, comprising: a rotor, having a driving magnet; a stator, formed in a tubular shape and disposed on an outer circumference side of the rotor, and having a driving coil; a partition wall member, having a partition wall in a substantially bottomed cylindrical shape disposed between the rotor and the stator; a circuit board, disposed outside the partition wall in an axial direction of the rotor, and secured at a bottom of the partition wall; and a resin sealing member made by a resin, covering the stator and the circuit board, and the stator comprising: an insulation member; a stator core, having a plurality of salient poles for winding the driving coil through the insulation member; and a plurality of terminal pins, electrically connected to an end portion of the driving coil, and disposed in parallel to the axial direction, wherein if a direction in which the circuit board is disposed relative to the partition wall in the axial direction is set as a first direction and an opposite direction of the first direction is set as a second direction, the circuit board is disposed closer to a side of the first direction than the stator core and the insulation member, a portion of the terminal pin on the side of the first direction is soldered and secured to the circuit board, the insulation member has a press fitting portion for pressing and securing a portion of the terminal pin on a side of the second direction, and a stopper portion is formed on a second direction end of the terminal pin, wherein the stopper portion contacts a surface of the press fitting portion on the side of the second direction known as a second direction surface to prevent the terminal pin from falling off in the first direction.

2. The motor according to claim 1, wherein
the stopper portion is a bent portion formed by partially bending the second direction end of the terminal pin.

3. The motor according to claim 1, wherein
the stator core comprises an outer circumference ring formed in a ring shape and the salient poles protruding from the outer circumference ring toward an inner side of a radial direction of the stator, and
the press fitting portion is formed on an axial covering portion, wherein the axial covering portion covers a part of the outer circumference ring from the side of the first direction in a circumferential direction of the stator,
two terminal pins are secured to the press fitting portion in the circumferential direction separating from each other by a pitch, and
the axial covering portion comprises a reinforcing thick-wall portion, wherein the reinforcing thick-wall portion is disposed between two stopper portions in the circumferential direction and connected to the second direction surface of the press fitting portion.

4. The motor according to claim 1, wherein
the stator core comprises an outer circumference ring formed in a ring shape and the salient poles protruding from the outer circumference ring toward an inner side of a radial direction of the stator, and
the press fitting portion is formed on an axial covering portion, wherein the axial covering portion covers a part of the outer circumference ring from the side of the first direction in a circumferential direction of the stator,
the axial covering portion comprises a contact covering portion, and the contact covering portion is disposed between the outer circumference ring and the second direction surface in the axial direction and contacts the outer circumference ring by covering a part of the outer circumference ring in the circumferential direction.

5. The motor according to claim 4, wherein
the stopper portion is a bent portion forming by partially bending the second direction end of the terminal pin, and
a length of the bent portion is shorter than a space between the press fitting portion and the contact covering portion in the axial direction.

6. The motor according to claim 1, wherein
two terminal pins are secured to the press fitting portion in a circumferential direction of the stator separating from each other by a pitch,
two pressing holes for pressing the two terminal pins into are formed on the press fitting portion, and
the pressing holes are formed to penetrate a surface of the press fitting portion from the side of the first direction to the second direction surface.

7. The motor according to claim 1, wherein
the stopper portion is a bent portion formed by partially bending the second direction end of the terminal pin,
the stator core comprises an outer circumference ring formed in a ring shape and the salient poles protruding from the outer circumference ring toward an inner side of a radial direction of the stator, and
the press fitting portion is formed on an axial covering portion, wherein the axial covering portion covers a part of the outer circumference ring from the side of the first direction in a circumferential direction of the stator,
two terminal pins are secured to the press fitting portion in the circumferential direction separating from each other by a pitch, and
the axial covering portion comprises a reinforcing thick-wall portion, wherein the reinforcing thick-wall portion is disposed between two bent portions in the circumferential direction and connected to the second direction surface of the press fitting portion, and
the bent portion is bent towards the reinforcing thick-wall portion.

8. The motor according to claim 1, wherein
the stator core comprises an outer circumference ring formed in a ring shape and the salient poles protruding from the outer circumference ring toward an inner side of a radial direction of the stator, and
the press fitting portion is formed on an axial covering portion, wherein the axial covering portion covers a part of the outer circumference ring from the side of the first direction in a circumferential direction of the stator,
two terminal pins are secured to the press fitting portion in the circumferential direction separating from each other by a pitch, and
the axial covering portion comprises a contact covering portion and comprises a reinforcing thick-wall portion, wherein the contact covering portion is disposed between the outer circumference ring and the second direction surface in the axial direction and contacts the outer circumference ring by covering a part of the outer circumference ring in the circumferential direction, and the reinforcing thick-wall portion is disposed between two stopper portions in the circumferential direction and connected to the second direction surface of the press fitting portion and the contact covering portion.

9. A method for manufacturing the motor according to claim 2, comprising:
an insulation member installing process for installing the insulation member on the stator core; a first pressing process for pressing the terminal pin into the press fitting portion after the insulation member installing process; a coil winding process for winding and bundling the end portion of the driving coil to the terminal pin and winding the driving coil to the salient pole through the insulation member after the first pressing process; a soldering process for soldering and securing the end portion of the driving coil to the terminal pins after the coil winding process; a second pressing process for pressing the terminal pin further into the press fitting portion after the soldering process; and a bent portion forming process for partially bending the second direction end of the terminal pin after the second pressing process.

10. A method for manufacturing the motor according to claim 5, comprising:
an insulation member installing process for installing the insulation member on the stator core; a first pressing process for pressing the terminal pin into the press fitting portion after the insulation member installing process; a coil winding process for winding and bundling the end portion of the driving coil to the terminal pin and winding the driving coil to the salient pole through the insulation member after the first pressing process; a soldering process for soldering and securing the end portion of the driving coil to the terminal pins after the coil winding process; a second pressing process for pressing the terminal pin further into the press fitting portion after the soldering process; and a bent portion forming process for partially bending the second direction end of the terminal pin after the second pressing process.

11. A method for manufacturing the motor according to claim 7, comprising:
an insulation member installing process for installing the insulation member on the stator core; a first pressing process for pressing the terminal pin into the press fitting portion after the insulation member installing process; a coil winding process for winding and bundling the end portion of the driving coil to the terminal pin and winding the driving coil to the salient pole through the insulation member after the first pressing process; a soldering process for soldering and securing the end portion of the driving coil to the terminal pins after the coil winding process; a second pressing process for pressing the terminal pin further into the press fitting portion after the soldering process; and a bent portion forming process for partially bending the second direction end of the terminal pin after the second pressing process.

* * * * *